US012810572B2

(12) United States Patent
Jang et al.

(10) Patent No.: US 12,810,572 B2
(45) Date of Patent: Nov. 24, 2026

(54) METHOD AND APPARATUS WITH OBJECT DETECTOR TRAINING

(71) Applicants: SAMSUNG ELECTRONICS CO., LTD., Suwon-si (KR); Korea University Research and Business Foundation, Seoul (KR)

(72) Inventors: Sujin Jang, Suwon-si (KR); Sangpil Kim, Seoul (KR); Jinkyu Kim, Seoul (KR); Wonseok Roh, Seoul (KR); Gyusam Chang, Seongnam-si (KR); Dongwook Lee, Suwon-si (KR); Dae Hyun Ji, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 471 days.

(21) Appl. No.: 18/451,287

(22) Filed: Aug. 17, 2023

(65) Prior Publication Data

US 2024/0161442 A1 May 16, 2024

(30) Foreign Application Priority Data

Nov. 7, 2022 (KR) ........................ 10-2022-0147333
Jan. 16, 2023 (KR) ........................ 10-2023-0006147

(51) Int. Cl.
*G06V 10/25* (2022.01)
*G01S 17/86* (2020.01)
(Continued)

(52) U.S. Cl.
CPC .............. *G06V 10/25* (2022.01); *G01S 17/86* (2020.01); *G01S 17/89* (2013.01); *G06V 10/44* (2022.01);
(Continued)

(58) Field of Classification Search
None
See application file for complete search history.

(56) References Cited

U.S. PATENT DOCUMENTS

2019/0147245 A1* 5/2019 Qi .......................... G06V 10/82 382/103
2022/0114733 A1 4/2022 Feng et al.
(Continued)

FOREIGN PATENT DOCUMENTS

EP 3 223 191 B1 5/2021

OTHER PUBLICATIONS

Zou et al., "Instance-level 3D shape retrieval from a single image by hybrid-representation-assisted joint embedding" (Year: 2021).*
(Continued)

*Primary Examiner* — SJ Park
(74) *Attorney, Agent, or Firm* — NSIP Law

(57) ABSTRACT

A method and apparatus with object detector training is provided. The method includes obtaining first input data and second input data from a target object; obtaining second additional input data by performing data augmentation on the second input data; extracting a first feature to a shared embedding space by inputting the first input data to a first encoder; extracting a second feature to the shared embedding space by inputting the second input data to a second encoder; extracting a second additional feature to the shared embedding space by inputting the second additional input data to the second encoder; identifying a first loss function based on the first feature, the second feature, and the second additional feature; identifying a second loss function based on the second feature and the second additional feature; and updating a weight of the second encoder based on the first loss function and the second loss function.

19 Claims, 6 Drawing Sheets

(51) Int. Cl.
*G01S 17/89* (2020.01)
*G06V 10/44* (2022.01)
*G06V 10/74* (2022.01)
*G06V 10/764* (2022.01)
*G06V 10/82* (2022.01)

(52) U.S. Cl.
CPC .......... *G06V 10/761* (2022.01); *G06V 10/764* (2022.01); *G06V 10/82* (2022.01); *G06V 2201/07* (2022.01)

(56) References Cited

U.S. PATENT DOCUMENTS

| | | | |
|---|---|---|---|
| 2022/0164585 | A1 | 5/2022 | Ayvaci et al. |
| 2022/0180101 | A1 | 6/2022 | Rai et al. |
| 2022/0346268 | A1 | 10/2022 | Park et al. |

OTHER PUBLICATIONS

Yan, Yan, Yuxing Mao, and Bo Li. "Second: Sparsely embedded convolutional detection." *Sensors* 18.10 (2018): 3337.

Shi, Shaoshuai, et al. "Pv-ronn: Point-voxel feature set abstraction for 3d object detection." *Proceedings of the IEEE/CVF conference on computer vision and pattern recognition*. 2020.

Wang, Yan, et al. "Train in Germany, test in the USA: Making 3d object detectors generalize." *Proceedings of the IEEE/CVF Conference on Computer Vision and Pattern Recognition*. 2020.

Yang, Jihan, et al. "St3d: Self-training for unsupervised domain adaptation on 3d object detection." *Proceedings of the IEEE/CVF conference on computer vision and pattern recognition*. 2021.

Yihan, Zeng, et al. "Learning transferable features for point cloud detection via 3d contrastive co-training." *Advances in Neural Information Processing Systems* 34 (2021):21493-21504.

Wei, Yi, et al. "Lidar distillation: Bridging the beam-induced domain gap for 3d object detection." *European Conference on Computer Vision*. Cham: Springer Nature Switzerland, 2022.

* cited by examiner

METHOD AND APPARATUS WITH OBJECT DETECTOR TRAINING

CROSS-REFERENCE TO RELATED APPLICATIONS

This application claims the benefit under 35 USC § 119(a) of Korean Patent Application No. 10-2022-0147333, filed on Nov. 7, 2022, and Korean Patent Application No. 10-2023-0006147, filed on Jan. 16, 2023, in the Korean Intellectual Property Office, the entire disclosures of which are incorporated herein by reference for all purposes.

BACKGROUND

1. Field

The following description relates to a method and an apparatus with object detector training.

2. Description of Related Art

Three-dimensional (3D) object detection technology is often used in advanced driver assistance systems (ADAS). For example, the 3D object detection technology may be used for front facing cameras, multi-cameras, and surround view monitors (SVM). In addition, the 3D object detection technology may provide a detection function for detecting the exact location (a 3D location of a vehicle reference object) and classification information (e.g., pedestrians, vehicles, traffic lights) of objects around an autonomous vehicle, and for determining optimal driving paths.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes obtaining first input data and second input data from a target object; obtaining second additional input data by performing data augmentation on the second input data; extracting a first feature to a shared embedding space by inputting the first input data to a first encoder; extracting a second feature to the shared embedding space by inputting the second input data to a second encoder; extracting a second additional feature to the shared embedding space by inputting the second additional input data to the second encoder; identifying a first loss function based on the first feature, the second feature, and the second additional feature; identifying a second loss function based on the second feature and the second additional feature; and updating a weight of the second encoder based on the first loss function and the second loss function.

The identifying of the first loss function may include generating first positive/negative pair information between the first feature, the second feature, and the second additional feature; and identifying the first loss function based on the first positive/negative pair information.

The generating of the first positive/negative pair information may include generating a similarity between the first feature, the second feature, and the second additional feature; and generating the first positive/negative pair information based on the similarity.

The generating of the first positive/negative pair information may include generating class information corresponding to each of the first feature, the second feature, and the second additional feature; and generating the first positive/negative pair information based on the class information.

The identifying of the second loss function may include generating second positive/negative pair information between the second feature and the second additional feature; and identifying the second loss function based on the second positive/negative pair information.

The generating of the second positive/negative pair information may include generating a similarity between the second feature and the second additional feature; and generating the second positive/negative pair information based on the similarity.

The first loss function may extract semantic information of the first feature to be applied to the second feature and the second additional feature.

The second loss function may suppress noise in the first feature.

The first and second input data may be associated with the target object; wherein the first input data may include an image about the target object; and wherein the second additional input data may be generated by performing data augmentation on the second input data. The method may further include generating first additional input data by performing data augmentation on the first input data.

The generating of the first additional input data may include applying random parameter distortion (RPD) to the first input data.

The RPD may include arbitrarily transforming at least one of a scale, a parameter, or a bounding box of the image.

The second input data may include a light detection and ranging (LiDAR) point set, and the second additional input data may be generated by applying random point sparsity (RPS) to the second input data.

The RPS may include applying interpolation to the LiDAR point set.

In another general aspect, a computing apparatus includes one or more processors configured to execute instructions; and one or more memories storing the instructions; wherein the execution of the instructions by the one or more processors configures the one or more processors to extract a first feature to a shared embedding space in first input data; extract a second feature to the shared embedding space in second input data; extract a second additional feature to the shared embedding space in second additional input data; identify a first loss function based on the first feature, the second feature, and the second additional feature; identify a second loss function based on the second feature and the second additional feature; and update a weight of a second encoder based on the first loss function and the second loss function.

The one or more processors may be configured to generate first positive/negative pair information between the first feature, the second feature, and the second additional feature; and identify the first loss function based on the first positive/negative pair information.

The one or more processors may be configured to generate a similarity between the first feature, the second feature, and the second additional feature; and generate the first positive/negative pair information based on the similarity.

The one or more processors may be configured to generate class information corresponding to each of the first feature, the second feature, and the second additional feature; and generate the first positive/negative pair information based on the class information.

The one or more processors may be configured to generate second positive/negative pair information between the second feature and the second additional feature; and identify the second loss function based on the second positive/negative pair information.

The one or more processors may be configured to generate a similarity between the second feature and the second additional feature; and generate the second positive/negative pair information based on the similarity.

In another general aspect, an electronic device includes a sensor configured to sense a target light detection and ranging (LiDAR) point set associated with a target object; and one or more processors, wherein the one or more processors are configured to generate a feature vector corresponding to the target object by inputting the target LiDAR point set to a neural network (NN) model; and estimate the target object by inputting the feature vector to a detection head of the NN model, wherein the NN model is trained based on a source LiDAR point set and image data having a domain different from the target LiDAR point set.

Other features and aspects will be apparent from the following detailed description, the drawings, and the claims.

Figure 1:
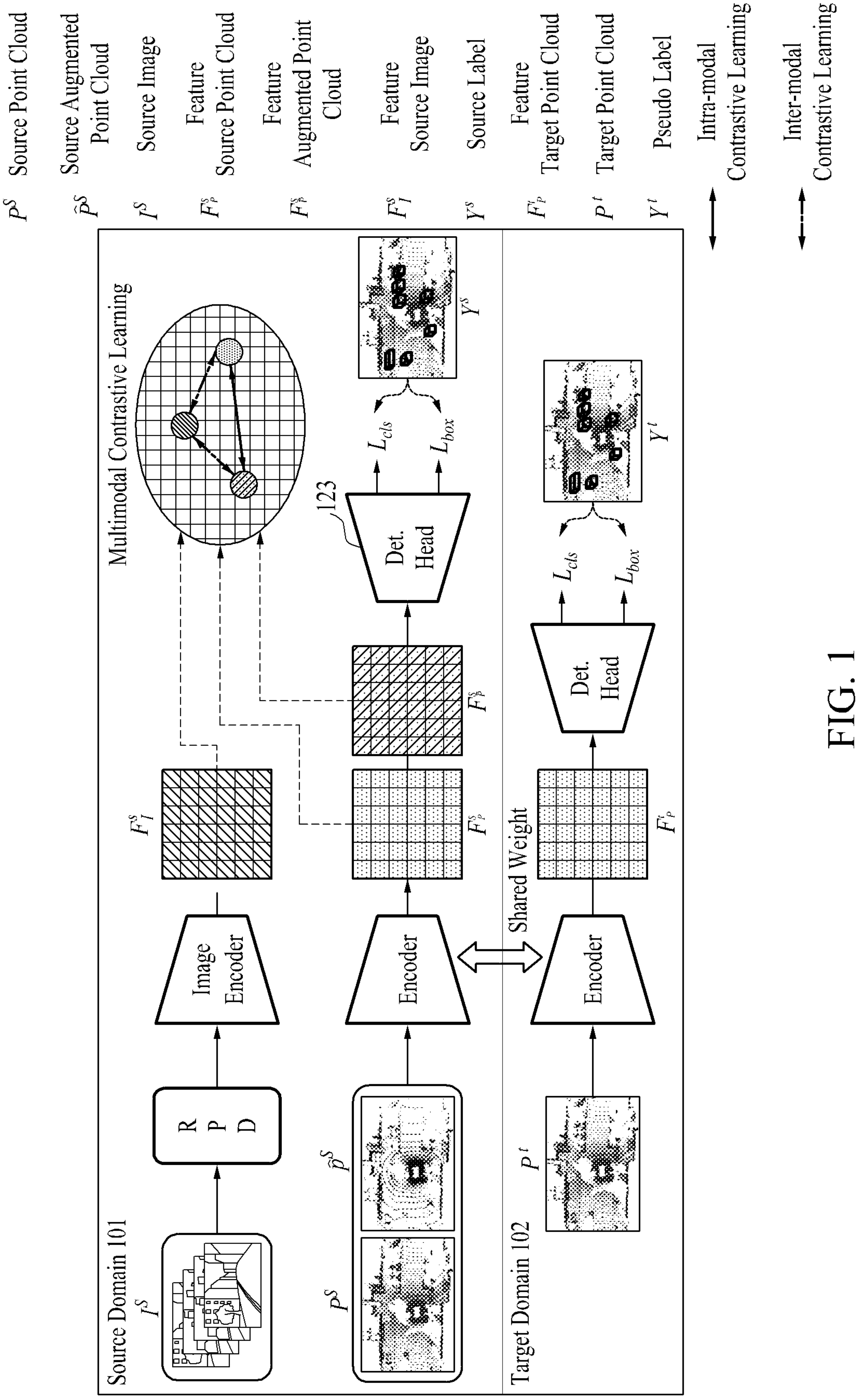
FIG. 1 illustrates an example method with object detector training according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

FIG. 1 illustrates an example method with object detector training according to one or more embodiments.

As illustrated in FIG. 1, one or more blocks and a combination thereof may be implemented by a special-purpose hardware-based computer that performs a predetermined function, or a combination of computer instructions and special-purpose hardware.

A typical three-dimensional (3D) object detection technology may be utilized to classify a location and a category of an object in three dimensions using a high-precision light detection and ranging (LiDAR) sensor, for example, in the field of autonomous driving. However, it is found that the typical 3D object detection technology may require vast resources in data collection, and most datasets may have a biased structure (e.g., LiDAR resolution, region, and weather), which may lead to a network being buried in a certain domain. To solve the problems described, an unsupervised domain adaptation (UDA) may aim to maintain performance of a trained domain even in other untrained domains and may verify performance of a model trained from a labeled source dataset in an unlabeled target.

Thus, it is found herein to be beneficial to utilize an LiDAR-based 3D object detection approach in the following example operations/methods and apparatuses/system, which approach is able to collect a 360-degree)(° surround view-point cloud from the LiDAR sensor, convert the 360° surround view-point cloud into a form of a voxel or a pillar, and input the converted 360° surround view-point cloud to an encoder. In an example, each feature output from the encoder may predict bounding boxes and classes including location information of an object by undergoing a decoding process in a detection head (e.g., a detection head 123 in FIG. 2).

Referring to FIG. 1, an example computing apparatus 100 may include a neural network (NN) model trained based on a dataset labeled in a source domain 101 to a NN model of a target domain 102 that trains an unlabeled dataset. The NN model in one embodiment generally is a type of machine learning model having a problem-solving or other inference capability. The NN model may be configured to perform a neural network operation using an accelerator. In an example, the computing apparatus 100 may be, or exterior or interior of, the accelerator. As non-limiting examples, the accelerator may include a neural processing unit (NPU), a graphics processing unit (GPU), a field-programmable gate array (FPGA), an application-specific integrated circuit (ASIC), or an application processor (AP), any or any combination of which are represented by at least one processor (e.g., one or more processors in FIG. 2). Alternatively, the accelerator may be implemented as a software computing environment, such as a virtual machine or the like.

Figure 2:
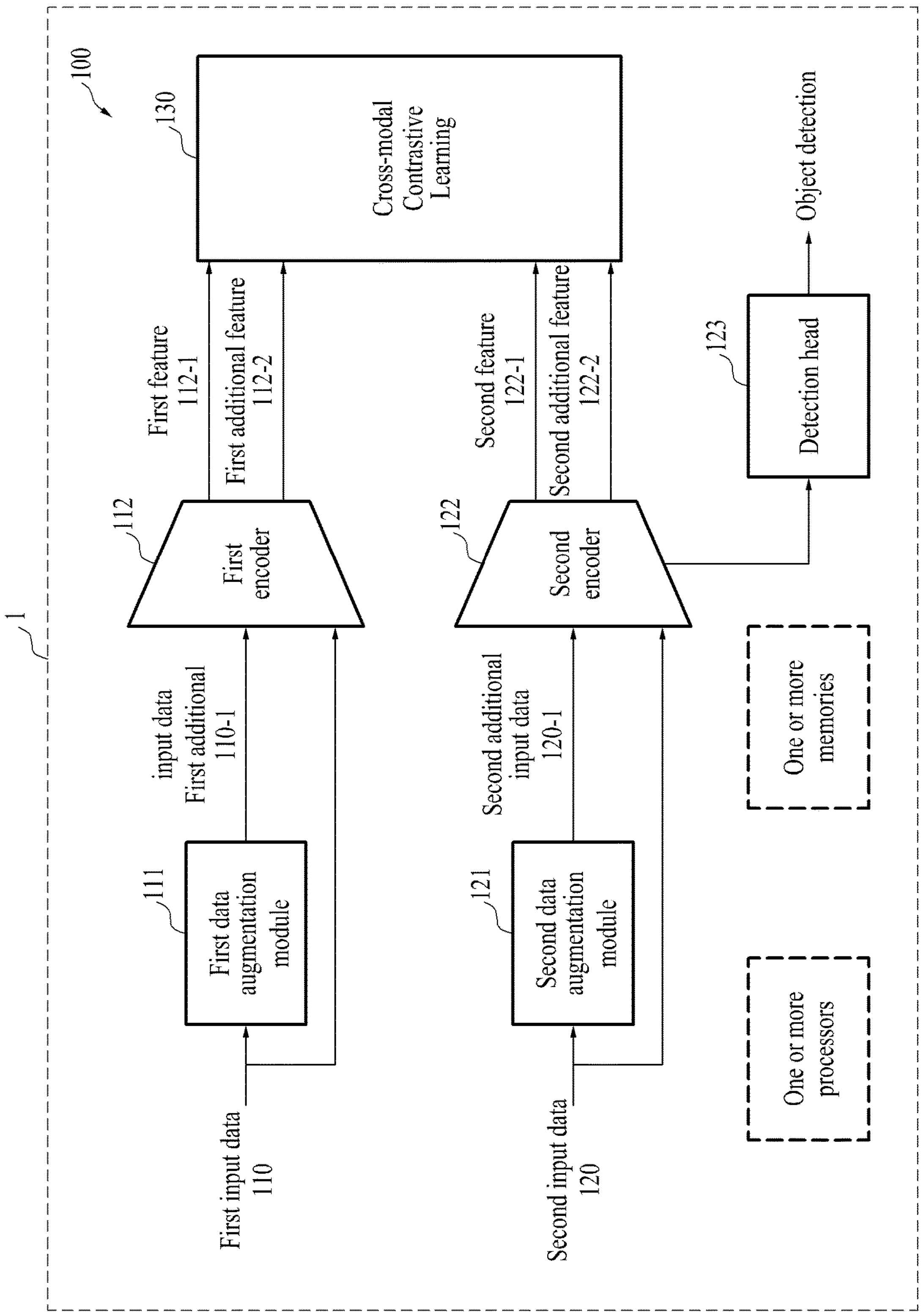
FIG. 2 illustrates an example electronic apparatus or system with object detector training according to one or more embodiments.

In an example, the computing apparatus 100 may be a computing apparatus or a component or operation of an electronic device 1 (in FIG. 2).

The computing apparatus 100 may be in a personal computer (PC), a data server, or a portable device, or the electronic device 1 may be the PC, the data server, or the portable device. The portable device may be implemented as, as non-limiting examples, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be implemented as a smart watch, a smart band, a smart ring, or the like.

The electronic device 1 may include one or more processors configured to execute instructions, and one or more memories storing the instructions. The execution of the instructions by the one or more processors may configure the one or more processors to perform any one or any combinations of operations/methods describes herein.

In an example, the computing apparatus 100 may be configured to receive an image $I^s$ as an input. The image $I^s$ may be transformed into an additional image through a random parameter distortion (RPD) in the computing apparatus 100. An image encoder may extract a feature $$F_I^s$$

of the image and a feature of the additional image to a shared embedding space. The image $I^s$ may be an image of a target object captured by a sensor (e.g., a camera). The computing apparatus 100 may be configured to receive a LiDAR point cloud $P^s$ (hereinafter, referred to as a LiDAR point set) of the source domain 101 as an input. The LiDAR point set may be transformed into an additional LiDAR point set $\hat{P}^s$ through a random point sparsity (RPS) in the computing apparatus 100. A LiDAR encoder may extract a feature $$F_P^s$$

of the LiDAR point set and a feature $$F_{\hat{P}}^s$$

of the additional LiDAR point set $\hat{P}^s$ to the shared embedding space.

The computing apparatus 100 may be configured to perform contrastive learning on the features $$F_P^s$$

and $$F^s_{\hat{P}}$$

through cross-modal contrastive learning. The computing apparatus 100 may update the LIDAR encoder and the NN model of the detection head 123 based on a result of the contrastive learning. The detection head 123 may train the LiDAR point set of a labeled source domain and may extract class $L_{cis}$ information and bounding box $L_{box}$ information.

The computing apparatus 100 may be configured to apply the NN model updated in the source domain 101 to the LiDAR encoder and the detection head 123 of the target domain 102 so that object estimation and detection performance of the target domain 102 may be improved.

Hereinafter, an example method and apparatus/system with object detector training will be described in greater detail below with reference to FIGS. 2 through 6.

FIG. 2 illustrates an example apparatus with object detector training according to one or more embodiments.

In FIG. 2, one or more blocks and a combination thereof may be implemented by a special-purpose hardware-based computer that performs a predetermined function, or a combination of computer instructions and special-purpose hardware.

The description provided with reference to FIG. 1 may apply to the description provided with reference to FIG. 2.

Referring to FIG. 2, the computing apparatus 100 may be a computing apparatus or a component or operation of the electronic device 1 described above. As a non-limiting example, the computing apparatus 100 may include first and second data augmentation modules 111 and 121, first and second encoders 112 and 122, a detection head 123, and a cross-modal contrastive learning module 130.

A "module" may be a minimum unit or part of an integrally formed part. The "module" may be a minimum unit or part that performs one or more functions. The "module" may be implemented mechanically or electronically. For example, a "module" may include at least one of an application-specific integrated circuit (ASIC) chip, a field-programmable gate array (FPGA), or a programmable-logic device for performing certain operations that are well known or to be developed in the future.

First input data 110 may include the image $I^s$ about a target object, which may be captured by a sensor (e.g., a camera). When a domain of the image (e.g., the first input data 110) is changed, parameter deviation may occur due to an intrinsic feature of a camera or an extrinsic factor. When parameter deviation occurs, a geometric error may occur when estimating a location of the target object in a 3D space.

The first data augmentation module 111 may generate first additional input data 110-1 by augmenting the first input data 110. The first data augmentation module 111 may perform the RPD as a data augmentation method. The RPD may be a method of arbitrarily transforming at least one of the scale, the parameter, or the bounding box of the image. The first data augmentation module 111 may perform the RPD method in the same manner as in Equation 1 below.

$$t_n = \begin{pmatrix} \text{focal}_x & 0 & \text{center}_u & 0 \\ 0 & \text{focal}_y & \text{center}_v & 0 \\ 0 & 0 & 1 & 0 \end{pmatrix} \qquad \text{Equation 1}$$

In the matrix of Equation 1, $T=\{t_1, t_2, t_3, \ldots, t_n\}$ denotes transformation matrices that project LiDAR coordinates onto an image. In addition, focal denotes a focal length and center denotes central coordinates of a camera.

$$\hat{T} = \hat{K} \cdot T \qquad \text{Equation 2}$$

Equation 2 shows an equation obtained by multiplying the transformation matrix expressed in Equation 1 by a scale factor $K=[k_1, k_2, \ldots, k_N]$ expressed in homogeneous coordinates. The first data augmentation module 111 may generate an input image $I \in \mathbb{R}^{H \times W \times 3}$ as a transformed image $\hat{I} \in \mathbb{R}^{KH \times HW \times 3}$ using the scale factor K.

The first encoder 112 may receive the first input data 110, from which the first encoder 112 may extract a first feature $$F^s_I$$

112-1. The first encoder 112 may receive the first additional input data 110-1, from which the first encoder 112 may extract a first additional feature 112-2.

Second input data 120 may include a LiDAR point set about a target object. The LiDAR-based 3D object detection may not yield consistent performance (e.g., resolution) in a situation where certain domains (e.g., LiDAR beam, climate, and region) are changed to different domains. To solve the above-described problem, second additional input data 120-1 may be generated/obtained by applying RPS to the LiDAR point set.

In an example, the second data augmentation module 121 may generate the second additional input data 120-1 by applying RPS to the second input data 120. The RPS may be a method of randomly adjusting the density of a LiDAR point set by performing interpolation on a resolution difference of the LiDAR for each dataset. The interpolation may be a type of method of estimating an unknown value using known data values. For example, when a function value $f(x_i)$ for a value $x_i$ ($i=1, 2, \ldots, n$) of two or more variables having a predetermined interval (e.g., an equal interval or an unequal interval) is known even though the shape of a function f(x) of a real variable x is unknown, a function value for a predetermined value between known function values may be estimated by interpolation. The interpolation may be used when estimating a value at an unobserved point from an observed value obtained through experiments or observations or when obtaining a function value not listed in a function table, such as a logarithm table.

The second encoder 122 may receive the second input data 120, from which the second encoder 122 may extract a second feature $$F_{P^s}$$

122-1. The second encoder 122 may receive the second additional input data 120-1, from which the second encoder 122 may extract a second additional feature $$F^s_{\hat{P}}$$

122-2.

The computing apparatus 100 may transmit the first feature $$F_I^s$$

112-1, the first additional feature 112-2, the second feature $$F_{P^s}$$

122-1, and the second additional feature $$F_{\hat{P}}^s$$

122-2 to a shared embedding space. That is, the first encoder 112 and the second encoder 122 may extract the features to the shared embedding space.

In an example, the cross-modal contrastive learning module 130 may perform contrastive learning based on these features 112-1, 112-2, 122-1 and 122-2 transmitted to the shared embedding space. In an example, the cross-modal contrastive learning module 130 may perform intra-modal contrastive learning and inter-modal contrastive learning on these features 112-1, 112-2, 122-1 and 122-2. The contrastive learning method is described below with reference to FIGS. 3 through 6.

Figure 3:
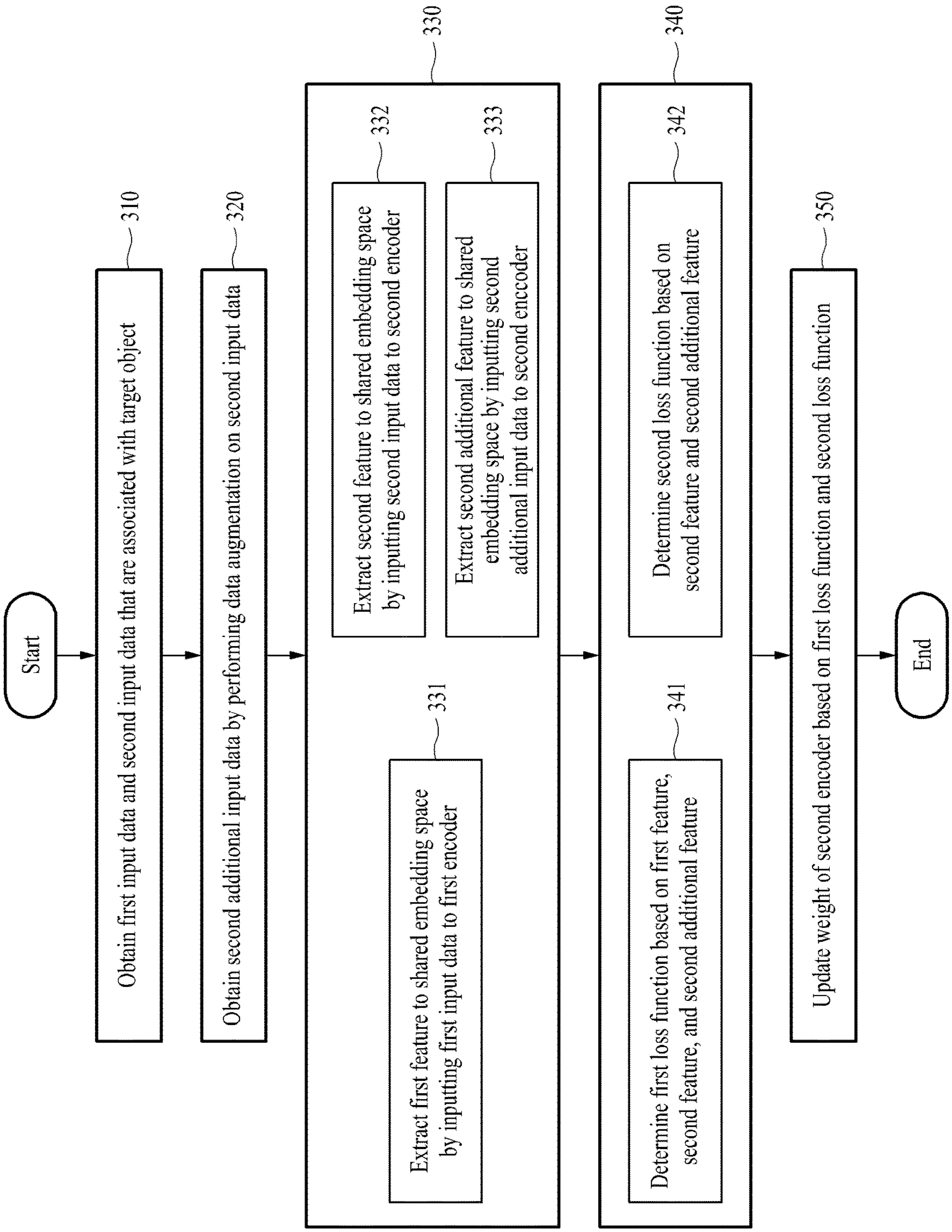
FIG. 3 illustrates an example method with object detector training according to one or more embodiments.

FIG. 3 illustrates an example method with object detector training according to one or more embodiments.

As illustrated in FIG. 3, operations 310 through 350 may be performed in the shown order and manner. However, the order of some operations may be changed, or some of the operations may be omitted, without departing from the spirit and scope of the shown example. Operations 310 through 350 of FIG. 3 may be performed in parallel, simultaneously, or any suitable order that may optimize the method.

The description provided with reference to FIGS. 1 and 2 may apply to FIG. 3.

For convenience of description, it is described that operations 310 through 350 are performed using the computing apparatus 100 described with reference to FIG. 2. However, operations 310 through 350 may be performed by another suitable electronic device or in a suitable system.

In operation 310, the computing apparatus 100 may be configured to obtain the first input data 110 and the second input data 120 that are associated with a target object. The first input data 110 may include an image about the target object. The image may be captured by a sensor (e.g., a camera). The second input data 120 may include a LiDAR point set about the target object.

In operation 320, the computing apparatus 100 may be configured to obtain the second additional input data 120-1 by performing data augmentation on the second input data 120.

In an example, the second data augmentation module 121 of the computing apparatus 100 may generate the second additional input data 120-1 by applying RPS to the second input data 120. The RPS may be a method of applying interpolation to the LiDAR point set.

In an example, the first data augmentation module 111 of the computing apparatus 100 may generate the first additional input data 110-1 by performing data augmentation on the first input data 110. The first data augmentation module 111 may apply RPD to the first input data 110. The RPD may be a method of arbitrarily transforming at least one of the scale, the parameter, or the bounding box of the image.

In operation 330, the computing apparatus 100 may be configured to extract the features of each of the first input data 110, the second input data 120, and the second additional input data 120-1 to the shared embedding space. In an example, operation 330 may include operations 331 through 333.

In operation 331, the computing apparatus 100 may be configured to extract the first feature 112-1 to the shared embedding space by inputting the first input data 110 to the first encoder 112.

In operation 332, the computing apparatus 100 may be configured to extract the second feature 122-1 to the shared embedding space by inputting the second input data 120 to the second encoder 122.

In operation 333, the computing apparatus 100 may be configured to extract the second additional feature 122-2 to the shared embedding space by inputting the second additional input data 120-1 to the second encoder 122.

In operation 340, the computing apparatus 100 may determine a first loss function and a second loss function using cross-modal contrastive learning. In an example, operation 340 may include operations 341 and 342.

In operation 341, the computing apparatus 100 may be configured to determine the first loss function based on the first feature 112-1, the second feature 122-1, and the second additional feature 122-2.

In an example, the cross-modal contrastive learning module 130 may identify/determine the first loss function that extracts semantic information of the first feature 112-1 for application to the second feature 122-1 and the second additional feature 122-2.

The cross-modal contrastive learning module 130 may generate/obtain first positive/negative pair information between the first feature 112-1, the second feature 122-1, and the second additional feature 122-2. The cross-modal contrastive learning module 130 may identify/determine the first loss function based on the first positive/negative pair information.

The cross-modal contrastive learning module 130 may generate/obtain a similarity between the first feature 112-1, the second feature 122-1, and the second additional feature 122-2. The cross-modal contrastive learning module 130 may generate/obtain the first positive/negative pair information based on the similarity.

The cross-modal contrastive learning module 130 may generate/obtain class information corresponding to each of the first feature 112-1, the second feature 122-1, and the second additional feature 122-2. The cross-modal contrastive learning module 130 may generate/obtain the first positive/negative pair information based on the class information.

In operation 342, the computing apparatus 100 may identify/determine the second loss function based on the second feature 122-1 and the second additional feature 122-2.

The cross-modal contrastive learning module 130 may identify/determine the second loss function that suppresses noise in the first feature 112-1.

The cross-modal contrastive learning module 130 may generate/obtain second positive/negative pair information between the second feature 122-1 and the second additional feature 122-2. The cross-modal contrastive learning module 130 may identify/determine the second loss function based on the second positive/negative pair information.

The cross-modal contrastive learning module 130 may generate/obtain a similarity between the second feature 122-1 and the second additional feature 122-2. The cross-modal contrastive learning module 130 may generate/obtain the second positive/negative pair information based on the similarity.

In an example, the cross-modal contrastive learning module 130 may perform the above-described operations by replacing the first feature 112-1 with the first additional feature 112-2.

The operations of the cross-modal contrastive learning module 130 are described in detail below with reference to FIGS. 4 through 6.

In operation 350, the computing apparatus 100 may be configured to update a weight of the second encoder 122 based on the first loss function and the second loss function.

Figure 4:
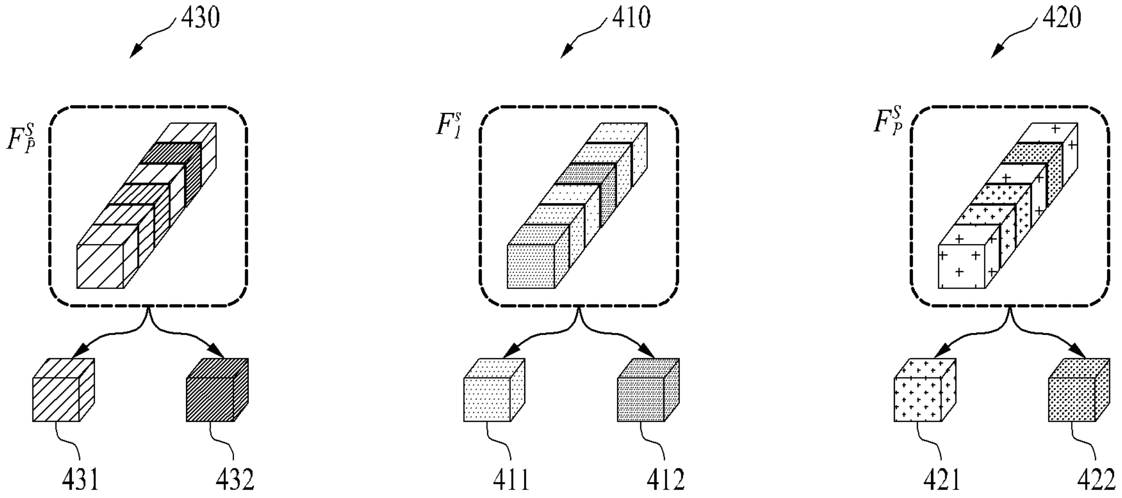
FIG. 4 illustrates an example feature vectors according to one or more embodiments.

FIG. 4 illustrates an example feature vectors according to one or more embodiments.

Figure 5:
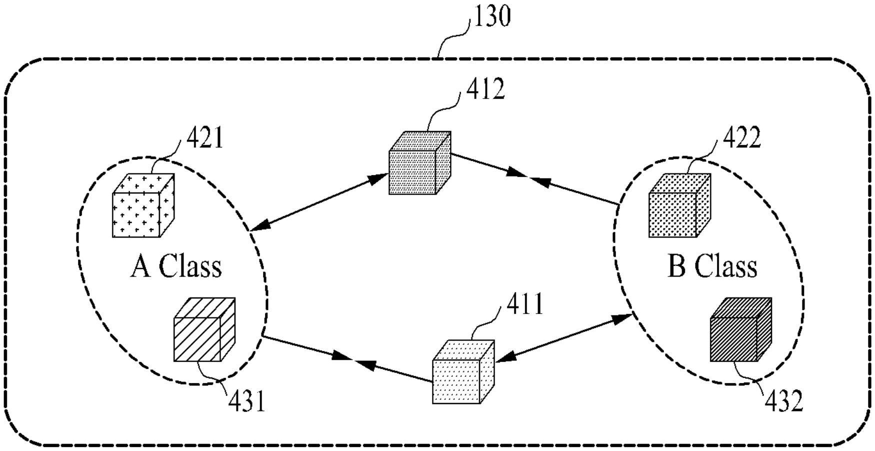
FIG. 5 illustrates an example intra-modal contrastive learning according to one or more embodiments.

FIG. 5 illustrates an example intra-modal contrastive learning according to one or more embodiments.

Figure 6:
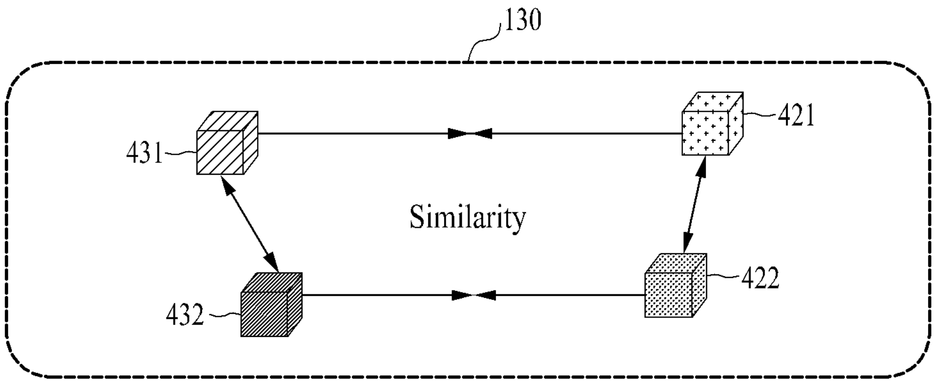
FIG. 6 illustrates another example inter-modal contrastive learning according to one or more embodiments.

FIG. 6 illustrates another example inter-modal contrastive learning according to one or more embodiments.

The description provided with reference to FIGS. 1 through 3 may apply to the examples of FIGS. 4 through 6.

Referring to FIG. 4, the first feature 112-1 of the first input data 110 may include a plurality of first feature vectors $$F_I^s$$

410. The second feature 122-1 of the second input data 120 may include a plurality of second feature vectors $$F_{P^s}$$

420. The second additional feature 122-2 of the second additional input data 120-1 may include a plurality of second additional feature vectors $$F_{\hat{P}}^s$$

430.

Referring to FIG. 5, the cross-modal contrastive learning module 130 may perform pivot-based intra-modal contrastive learning (hereinafter, referred to as intra-modal contrastive learning) on the features. The intra-modal contrastive learning may be a machine learning method of fusing a feature vector of an image with the LiDAR point set. The intra-modal contrastive learning may be a contrastive learning method that allows the LiDAR point set to include rich-geometric semantic information of the image. The first feature vectors $$F_I^s$$

410, the second feature vectors $$F_{P^s}$$

420, and the second additional feature vectors $$F_{\hat{P}}^s$$

430 may include localization and object class information. The intra-modal contrastive learning may be a method of linking regional geometric information to semantic information.

The intra-modal contrastive learning may perform contrastive learning at the instance level pivot on the first feature vectors 410. In the intra-modal contrastive learning, the cross-modal contrastive learning module 130 may generate/obtain a first positive/negative pair as shown in the matrix $$S = \underset{1 \leq j \leq N_s}{\mathrm{argmax}}\, \psi\left(F_i^P, F_j^I\right),\ 1 \leq i \leq N_s$$

based on a similarity. $N_s$ may denote the total number of samples of the source domain 101 and $$\psi(x, y) = \frac{x \cdot y}{\|x\|\,\|y\|}$$

may calculate a cosine similarity across features in a modal.

The cross-modal contrastive learning module 130 may generate/obtain the first positive/negative pair based on class information.

For example, referring to FIG. 5, the cross-modal contrastive learning module 130 may generate/obtain the first positive/negative pair with the class based on a first feature vector 411 and a first feature vector 412. A second feature vector 421 and a second additional feature vector 431 may form A class and a second feature vector 422 and a second additional feature vector 432 may form B class. The cross-modal contrastive learning module 130 may configure A class similar to the first feature vector 411 as a first positive pair and may configure B class not similar to the first feature vector 411 as a first negative pair. Conversely, the cross-modal contrastive learning module 130 may configure A class not similar to the first feature vector 412 as the first negative pair and may configure B class similar to the first feature vector 412 as the first positive pair. The cross-modal contrastive learning module 130 may update the first positive/negative pair by applying the class based on the similarity above-described to the first positive/negative pair. The updated first positive/negative pair matrix may be expressed as $S=S\times C_F$. $C_F$ may be a matrix including class pair information and may have a value of "1" for a feature vector of the same class and a value of "0" for a feature vector of different classes.

The cross-modal contrastive learning module 130 may set the first feature vectors 410 having image information including rich semantic information as a pivot and may perform contrastive learning for each of the second feature vectors 420 and the second additional feature vectors 430, sequentially. That is, objects of the same class from each modality in the shared embedding space may have similar feature vectors. The cross-modal contrastive learning module 130 may identify/determine the first loss function as shown in Equation 3 using the first positive/negative pair based on similar features.

$$\mathcal{L}_{intra} = -\sum_{(i,j)\in S_+} \log \frac{\exp(f_i^{I\top} \cdot f_j^P/\tau)}{\sum_{(i,k)\in S_-} \exp(f_i^{I\top} \cdot f_k^P/\tau)} \quad \text{Equation 3}$$

$f^I$ denotes object samples (the first feature vectors 410) of the image, $f^P$ denotes object features (the second feature vectors 420) of the LiDAR point set (e.g., a point cloud), and r denotes a scaling coefficient. The cross-modal contrastive learning module 130 may allow feature vectors of a 3D LiDAR point set to include rich semantic information of image feature vectors by minimizing $L_{intra}$. As a result, the intra-modal contrastive learning may reduce mismatch between modalities.

Referring to FIG. 6, the cross-modal contrastive learning module 130 may perform domain adaptive inter-modal contrastive learning (hereinafter, referred to as inter-modal contrastive learning) on the features.

The intra-modal contrastive learning may generate geometric noise other than semantic information of an image in a multi-modality environment.

The inter-modal contrastive learning may perform instance-level contrastive learning on the LiDAR point set. A LiDAR point set P of the LiDAR sensor in the source domain 101 (in FIG. 1) is given, an additional LiDAR point set $\hat{P}$ may be obtained by performing data augmentation on the LiDAR point set P. The cross-modal contrastive learning module 130 may generate a second positive/negative pair according to a similarity-priority criterion between the second feature 122-1 and the second additional feature 122-2 respectively extracted from the LiDAR point set P and the additional LiDAR point set $\hat{P}$. Unlike the intra-modal contrastive learning, the inter-modal contrastive learning may perform contrastive learning by focusing on the similarity between the features of objects without considering the class information.

For example, referring to FIG. 6, the cross-modal contrastive learning module 130 may perform contrastive learning on the second additional feature vector 431 as a similar positive pair and on the second feature vector 422 as a dissimilar negative pair, based on the second feature vector 421. In another example, the cross-modal contrastive learning module 130 may perform contrastive learning on the second additional feature vector 431 as a dissimilar negative pair and the second feature vector 422 as a similar positive pair, based on the second additional feature vector 432.

The cross-modal contrastive learning module 130 may determine the second loss function such as Equation 4 by applying the obtained second positive/negative pair to a contrastive alignment.

$$\mathcal{L}_{inter} = -\sum_{(i,j)\in S_+} \log \frac{\exp(f_i^{P\top} \cdot f_j^{\hat{P}}/\tau)}{\sum_{(i,k)\in S_-} \exp(f_i^{P\top} \cdot f_k^{\hat{P}}/\tau)} \quad \text{Equation 4}$$

In Equation 4, $f^P$ denotes object samples of an original LiDAR point set, $f^{\hat{P}}$ denotes object samples of an additional LiDAR point set, and r denotes a scaling coefficient. An object detector may indirectly experience the target domain 102 and may reduce problems that may occur when the domain is changed by minimizing the second loss function $L_{inter}$.

The cross-modal contrastive learning module 130 may determine a contrastive loss function $L_{cont}$ such as Equation 5 based on the determined first loss function and the determined second loss function.

$$L_{cont} = \lambda_{intra} L_{intra} + \lambda_{inter} L_{inter} \quad \text{Equation 5}$$

Referring to Equation 5, the second loss function $L_{inter}$ may ignore class-specific interactions between objects, while the first loss function $L_{intra}$ may prevent an embedding vector from driving to have a non-discriminative object function in the same class due to imbalance class problems of the dataset.

The cross-modal contrastive learning module 130 may use a traditional leverage loss function $L_{det}$ associated with a 3D bounding box and class in addition to the contrastive loss function $L_{cont}$. In conclusion, the cross-modal contrastive learning module 130 may determine a total loss function $L_{total}$ based on the contrastive loss function $L_{cont}$ and the traditional leverage loss function $L_{det}$. The cross-modal contrastive learning module 130 may perform contrastive learning using the total loss function $L_{total}$ as shown in Equation 6 below.

$$L_{total} = \lambda_{det} L_{det} + L_{cont} \quad \text{Equation 6}$$

In Equation 6, $\lambda_{det}$ denotes a hyperparameter derived to handle the strength of $L_{det}$ in a grid search.

The processors, memories, electronic devices, apparatuses, and other apparatuses, devices, models, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:

obtaining first input data and second input data from a target object;

obtaining second additional input data by performing data augmentation on the second input data;

extracting a first feature to a shared embedding space by inputting the first input data to a first encoder;

extracting a second feature to the shared embedding space by inputting the second input data to a second encoder;

extracting a second additional feature to the shared embedding space by inputting the second additional input data to the second encoder;

identifying a first loss function based on the first feature, the second feature, and the second additional feature;

identifying a second loss function based on the second feature and the second additional feature; and updating a weight of the second encoder based on the first loss function and the second loss function.

2. The method of claim 1, wherein the identifying of the first loss function comprises:

generating first positive/negative pair information between the first feature, the second feature, and the second additional feature; and identifying the first loss function based on the first positive/negative pair information.

3. The method of claim 2, wherein the generating of the first positive/negative pair information comprises:

generating a similarity between the first feature, the second feature, and the second additional feature; and generating the first positive/negative pair information based on the similarity.

4. The method of claim 2, wherein the generating of the first positive/negative pair information comprises:

generating class information corresponding to each of the first feature, the second feature, and the second additional feature; and generating the first positive/negative pair information based on the class information.

5. The method of claim 1, wherein the identifying of the second loss function comprises:

generating second positive/negative pair information between the second feature and the second additional feature; and identifying the second loss function based on the second positive/negative pair information.

6. The method of claim 5, wherein the generating of the second positive/negative pair information comprises:

generating a similarity between the second feature and the second additional feature; and generating the second positive/negative pair information based on the similarity.

7. The method of claim 1, wherein the first loss function extracts semantic information of the first feature to be applied to the second feature and the second additional feature.

8. The method of claim 1, wherein the second loss function suppresses noise in the first feature.

9. The method of claim 1, wherein the first and second input data are associated with the target object;

wherein the first input data comprises an image about the target object; and wherein the second additional input data is generated by performing data augmentation on the second input data;

the method further comprising:

generating first additional input data by performing data augmentation on the first input data.

10. The method of claim 9, wherein the generating of the first additional input data comprises applying random parameter distortion (RPD) to the first input data.

11. The method of claim 10, wherein the RPD comprises arbitrarily transforming at least one of a scale, a parameter, or a bounding box of the image.

12. The method of claim 1, wherein the second input data comprises a light detection and ranging (LiDAR) point set, and the second additional input data is generated by applying random point sparsity (RPS) to the second input data.

13. The method of claim 12, wherein the RPS comprises applying interpolation to the LiDAR point set.

14. A computing apparatus, comprising:

one or more processors configured to execute instructions; and one or more memories storing the instructions;

wherein the execution of the instructions by the one or more processors configures the one or more processors to:

extract a first feature to a shared embedding space in first input data;

extract a second feature to the shared embedding space in second input data;

extract a second additional feature to the shared embedding space in second additional input data;

identify a first loss function based on the first feature, the second feature, and the second additional feature;

identify a second loss function based on the second feature and the second additional feature; and update a weight of a second encoder based on the first loss function and the second loss function.

15. The apparatus of claim 14, wherein the one or more processors are configured to:

generate first positive/negative pair information between the first feature, the second feature, and the second additional feature; and identify the first loss function based on the first positive/negative pair information.

16. The apparatus of claim 15, wherein the one or more processors are configured to:

generate a similarity between the first feature, the second feature, and the second additional feature; and generate the first positive/negative pair information based on the similarity.

17. The apparatus of claim 16, wherein the one or more processors are configured to:

generate class information corresponding to each of the first feature, the second feature, and the second additional feature; and generate the first positive/negative pair information based on the class information.

18. The apparatus of claim 14, wherein the one or more processors are configured to:

generate second positive/negative pair information between the second feature and the second additional feature; and identify the second loss function based on the second positive/negative pair information.

19. The apparatus of claim 18, wherein the one or more processors are configured to:

generate a similarity between the second feature and the second additional feature; and generate the second positive/negative pair information based on the similarity.

* * * * *